United States Patent [19]

Pinard et al.

[11] Patent Number: 5,008,828
[45] Date of Patent: Apr. 16, 1991

[54] TOOL LATHE PROVIDED WITH IMPROVED CONTROL MEANS

[75] Inventors: Jean C. Pinard, Chevagnes; Bernard Jacquard, Yzeure; André Besancon, Moulins, all of France

[73] Assignee: Societe Somab S.A., Moulins, France

[21] Appl. No.: 264,969

[22] PCT Filed: Jan. 28, 1988

[86] PCT No.: PCT/FR88/00048
§ 371 Date: Oct. 3, 1988
§ 102(e) Date: Oct. 3, 1988

[87] PCT Pub. No.: WO88/05936
PCT Pub. Date: Aug. 11, 1988

[30] Foreign Application Priority Data
Jan. 30, 1987 [FR] France .................... 87 01430

[51] Int. Cl.$^5$ ............................ G06F 15/00
[52] U.S. Cl. .................. 364/474.28; 364/474.18; 364/191
[58] Field of Search ............ 364/474.28, 474.18, 364/191, 474.25, 167-171, 474-476

[56] References Cited
U.S. PATENT DOCUMENTS

| | | | |
|---|---|---|---|
| 4,709,509 | 12/1987 | Yoneda | 364/474.28 |
| 4,725,959 | 2/1988 | Nagata | 366/474.28 |
| 4,789,943 | 12/1988 | Yamanaka | 364/474.28 |
| 4,837,703 | 6/1987 | Kakazu | 364/474.28 |

Primary Examiner—Michael R. Fleming
Attorney, Agent, or Firm—Curtis, Morris & Safford

[57] ABSTRACT

Tooling lathe with programmable tool displacement. The lathe of the invention comprises, visible from the outside, a frame with body complete (1), a bench (3) supporting the movable headstock (4), a movable saddle (5) and a fixed headstock supporting a mandrel (7). The movable equipment (5) mounted on the saddle comprising essentially a tool holder (10), a couple of control cranks (13, 14) for dressing and traversing, a handling device (15) with five positions of which one is a central stop position, a display screen (18) and a control desk (20); a push button (16) allows to apply at each depression a feed demultiplication coefficient; a pair of push buttons (17) controls the running or stopping of the lathe; the lathe is characterized in that all control and monitoring members are carried by the movable equipment (5). Application to the turning of unitary parts and parts in small series.

9 Claims, 5 Drawing Sheets

TOOL LATHE PROVIDED WITH IMPROVED CONTROL MEANS

The present invention relates to the field of machine tools and, more particularly, to the field of lathes, and its subject is a tool lathe with programmable tool movement.

It is recalled that a lathe is a machine tool which essentially consists of a frame supporting, at one end, a part, which is called a fixed headstock, which itself supports a chuck by means of a rod and of a part, which is called a bed, consisting of a pair of guide ways, called a slide, which are parallel to each other and parallel to the axis of the rod. A movable headstock, comprising a tailstock with an axis which is merged with that of the rod, is mounted on the guide ways; the movable headstock may be displaced along the slide and be fixed thereon at any point; the slide also supports and guides a movable tool-holder assembly, called a "saddle".

It is recalled that the name "center lathes" is given to lathes in which the movements of the tool, both in the direction (x) which is perpendicular to the axis of the rod and in the direction (z) which is parallel to the axis of the rod, are linked to the rotation (n) of the chuck; among these center lathes the so-called universal or tool lathe, which fulfils various functions which render it universal, is distinguished.

Copying lathes which constitute a variety of semiautomatic lathes and in which the piece to be machined placed between centers is machined by a tool which is displaced automatically along a contour imposed by a former are also known; the tip of the tool therefore describes a path which reproduces the contour; the latter may be either a shaped sheet of metal or a copy of the machined piece.

Copying lathes, called "cycled" lathes, by means of which the tool performs successive passes according to the copying contour, returning to its starting point after each pass while the path of the tool is, from one pass to the next and at the start of a pass close to the final path reproducing the contour to the final diameter dimensions of the machined piece are also known; for this purpose, the guide contour is translated from one pass to the next from the thickness of the chip to production of the final diameter dimensions of the piece; in short, manual operations are limited to placing a blank in the chuck and to removing the machined piece.

It will be noted that in copying lathes, including cycled copying lathes, it is not known, at least by the Applicant, for the contour to be modifiable without being removed from the lathe.

Finally, lathes whose tool path is programmable using microelectronic means and data processing are known; however, these lathes, called digital control lathes, require very long and therefore very expensive programming work and require personnel qualified in the subject, and are therefore used only in series production.

The idea of the invention was born from the observation that in general mechanical workshops there were currently in existence tool lathes, most of which are fairly old machines, because the development of the technique has led builders towards manufacturing more sophisticated digital-control machines; this direction is the result of the development of the demand for machines which are increasingly productive. However, conventional machines still have their place on the market and only old and accurate machines are retained in service. Part of the renewal of this stock of machines is currently provided by fairly cheap machines which, nevertheless, do not give the demanding technician complete satisfaction with respect to reliability. The economic crisis held back renewal of the stock of tool lathes when the renewal of the industry leads to a growing requirement for these machines; tool lathes of modern design must fulfil the demand of users seeking reliable and accurate machines which are very simple to use and reasonably priced.

An aim of the present invention is to propose to lathe operators a tool lathe which makes it possible to simply and rapidly predefine a machining contour and, this being predefined, to operate in the manner of copying lathes, including cycled copying lathes. Another aim of the invention is to give the lathe operator the means to display the dimensions or parameters of the machining contour which he had predefined.

Another aim of the invention is to propose to the lathe operator a lathe which, although comprising means which make a certain amount of automation of the operations possible, may also be used in the conventional manual manner.

The original idea of the present invention therefore consisted in equipping a copying center lathe with means for rapidly and simply defining and modifying the copying contour. Another aspect of the original idea of the invention is to break down a copying contour into elementary contours to make it possible, using these elementary contours, to define a complex machining contour or tool path.

Elementary path is traditionally understood to mean turning, facing, taper pass or linear interpolation, radial pass or circular interpolation, threading pass, with a substantial advance of the tool. Complex path is understood to mean the succession of elementary paths, for example a taper path followed by a radial path followed by another taper path.

The original idea as defined above may be embodied in two distinct ways.

According to a first embodiment, called an analog embodiment, the elementary contours could be disposed in the form of master templates in a case in which they would be maneuverable and retractable by mechanical means in order to enable the lathe operator to achieve the desired complex contour; this complex contour could serve as a control for a roller acting directly or indirectly on the tool; in addition to each pass, the contour could be displaced. It may be appreciated, however, that these analog means, although technically realizable, would present a certain difficulty in embodiment.

According to a second embodiment, called a logical or digital embodiment, the elementary paths or the complex paths are defined numerically, the coordinates of the tool are located numerically and they are compared with the path defined; the means for numerical calculation and for comparison known per se in microdata processing techniques make it possible, with many other advantages, to provide the functions of the abovementioned analog means. It is this second type of solution which has been chosen in order to embody the original idea of the invention.

Therefore, and according to the invention, a tool lathe, that is to say of the type of lathe which is called a parallel lathe, in which the advance of the tool is a function of the rotation (n) of the chuck, making it possible to perform particularly the operations of turning (displacement of the tool parallel to the axis of the rod), of facing (displacement of the tool perpendicular to the axis of the rod), of linear interpolation, of threading (rapid displacement of the tool in proportion to the angle of rotation of the rod), of taper joining of (succession of a linear interpolation, of a partial circular interpolation and of a second linear interpolation), said lathe employing digital means of calculation and digital control known per se and controlled by a keyboard with keys and located in a computer/operator center, also called a processor or automaton' in order to cause the displacements of the tool, it being possible for said tool lathe to comprise, moreover' means for copying and for cycling, is generally defined in that it incorporates means, called first means, for selecting at least one machining contour, or tool path, from a plurality of elementary paths comprising turning, facing, linear interpolation path and circular interpolation path and threading, means, called second means, in order to, when the tool has been brought manually by means of a pair of levers into an initial position, call one or successively more parameters of this path in the group of parameters comprising a turning length, a final facing pass diameter, an angle of taper, a machining radius, a threading pitch (advance per turn), and in order to following the calling of one parameter, introduce the digital value of this parameter, means, called third means, in order to display the type of machining contour selected, the parameter or parameters called and their digital values introduced, finally means, called handling means, in order to, a machining contour at least having been selected and the tool being in the initial position, trigger the displacement of the tool on its path or alternatively to stop it at any point of the latter.

Preferably, the lathe of the invention comprises, moreover, means, called fourth means, in order to combine at least two of said elementary paths and to thereby select a complex path, said fourth means being controlled by a key of said keyboard.

Still preferably, recalling that the turning tool usually consists of a hard alloy tip having a certain radius and of a tip-holder in a resilient alloy, the lathe of the invention incorporates means' called fifth means, for entering into the automaton the radius of the tip, the fifth means being controlled by at least one key of the keyboard.

Still preferably, the lathe of the invention incorporates memorizing means, called sixth means, in order to, once a first series of operations has been performed on a blank, memorize the set of movements of the tool and in order to, once another blank which is substantially identical to the first has replaced the first, reproduce on this other blank the set of memorized movements.

According to an advantageous arrangement of the invention, the set of control means available to the operator as well as the display means are supported by the movable assembly called a saddle; these control means are distributed on a desk divided into two panels: one of the panels in fact comprises three keyboards and a register of push buttons and of control levers, the other panel consists of a register of push buttons and of control levers intended for memorization or learning, and for use of the memory. One of these keyboards, called the machining contour selection keyboard, comprises a first plurality of keys superposed on the drawing of a piece machined along all the contours mentioned above, one key being associated with one contour. Another keyboard, called a parameter call keyboard, comprises a second plurality of keys, each associated either with a parameter or with a particular operation (validation, cancellation, 45° bevel). A third keyboard, called a digital value entry keyboard, comprises a third plurality of keys, each associated respectively with a figure of the decimal system, with punctuation, and with the allocation of the negative character. These control means also comprise the levers, the manipulator and the "Go/-Stop" push buttons.

The control means described above constitute, with the automaton with which they are associated, the set of means, from the first to the sixth means, mentioned above; of course, the automaton is subject to a program, or software, which does not form part of the subject of the present description.

It will also be noted that one aspect of the invention is that of choosing the contours which may be selected, the choice of parameter, the clear disposition of the keyboards, the choice of the simple and sure sequence of controls, the decision left to the operator to choose, according to the work which he has to accomplish, between a conventional and purely manual control of operations and an automatic control, with a certain number of intermediate options.

According to a preferred construction disposition, the tool is moved in each of the directions x,z by, respectively, a motor with an axis controlled in a closed loop controlled by the automaton.

Since the lathe of the invention is intended to be of the universal type, it will be provided with means guaranteeing it an accuracy as high as that expected from the most accurate tool lathes, and this accuracy must not be restricted by the actual mechanical design of the lathe; to this end, a particular assembly of the bed on its bases is proposed and particular means for locking the fixed headstock.

Therefore, and recalling that in the tool lathes mentioned above, the slide of the saddle may be supported by a bed in a composite material of the "natural granite" or reconstituted granite type, the bed according to the invention has an L-shape, of which one part, called the slide-holder, has its large axis oriented horizontally, and of which another part, called the chuck-holder or "fixed headstock" has its large axis perpendicular to the previous axis, the face supporting the guide ways, called slides, of the slide-holder part being opposite the chuck-holder part and perpendicular to said large axis of the latter, the plane of said face forming an angle of approximately 60° with the horizontal plane; moreover, the bed rests on a pair of bases in hydraulic concrete, each base being provided with a recess for accommodating the bed, elastomer joints being disposed between the support faces, the forced support of the bed on its bases being achieved by means of a screw. This set of dispositions results in a particularly rigid and stable structure of the fixed parts of the lathe which permits a very great accuracy to be achieved from the latter.

In this manner again, and recalling that the movable headstock of a tool lathe may be displaced along the guide ways or alternatively may be immobilized on the latter, according to the invention, the immobilization of the movable headstock results, the headstock serving as support, from a traction on the lower face of the guide ways in a direction away from the bed; more precisely, immobilization of the headstock results from a pressure exerted on one of the guide ways, called an inclined guide way, and along two opposite edges of the latter, by two buffers with a V-shaped groove, one of the buffers, called a flange, being intended to bear on the faces called, lower and outer face respectively, of said inclined guide way, the other of the buffers, called immobilizing buffer, being intended to put pressure on the faces called, inner and upper face respectively, of said inclined guide way, said immobilizing buffer being mounted with single compensation at the end of a threaded shaft which may be screwed into a tapped hole of the frame of the headstock and which is provided with a screwing lever.

The present invention will be better understood and details thereof will emerge from the description which follows of a particular embodiment with reference to the figures of the appended plates, wherein.

Figures 1, 1A:
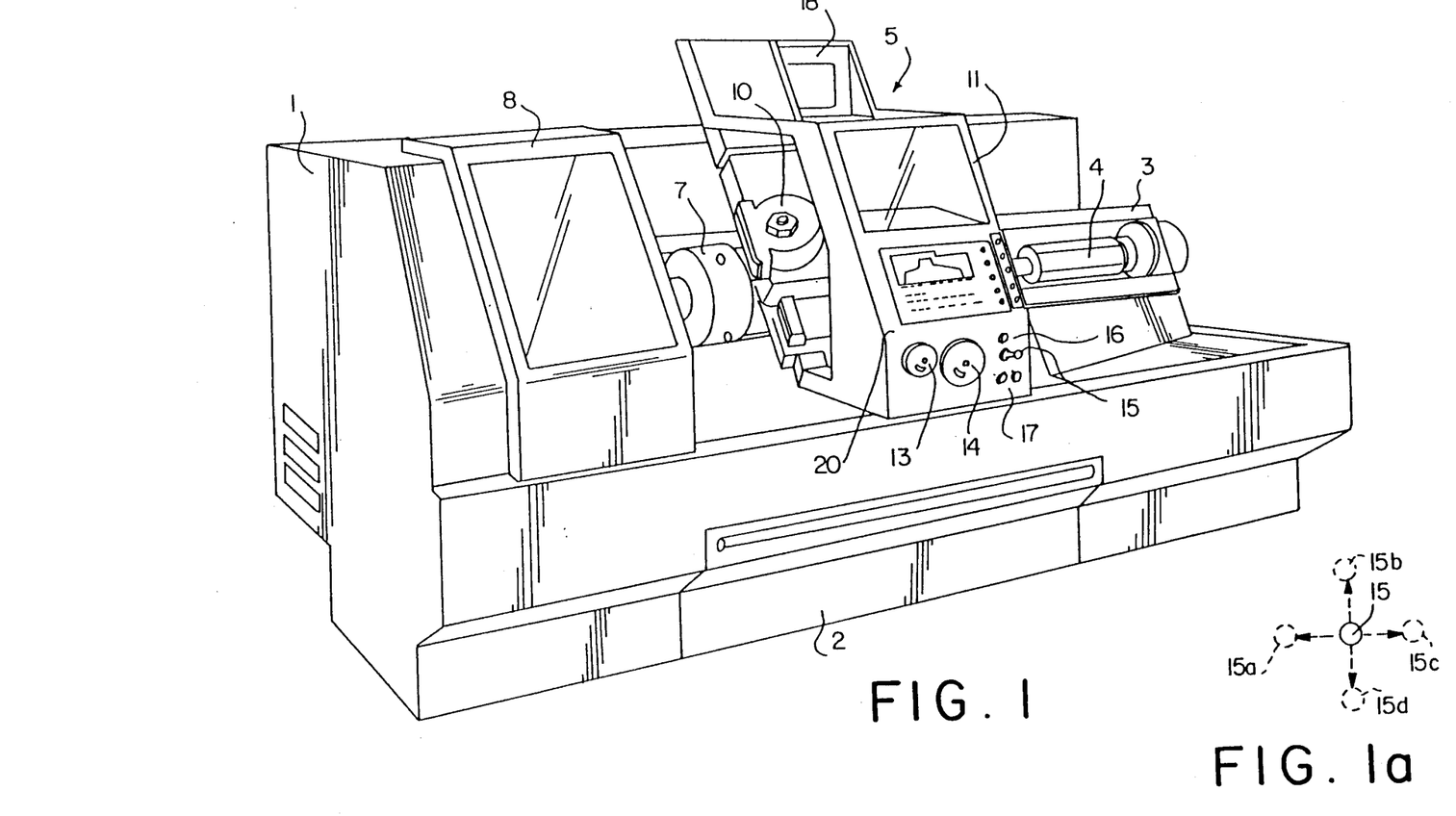
FIG. 1 is a representation in perspective of a lathe of the invention which makes it possible to locate a certain number of characteristics.
FIG. 1a illustrates in detail a control lever of the preceding figure.

In FIG. 1, a lathe of the invention comprises, visible from the outside, an enclosed frame 1 with a chip drawer 2, a bed 3 supporting the movable headstock 4, a movable assembly 5, called a saddle, and a fixed headstock supporting a chuck 7 which may be hidden by a movable protector 8. The movable equipment 5, mounted on the saddle, principally comprises a toolholder 10, a protective screen 11, a pair of control levers 13, 14, transverse for facing and longitudinal for turning, respectively, a lever 15 with five positions including one central stop position (FIG. 1a), a display screen 18 and a control desk 20. A push button 16 makes it possible, at each press, to show a reducing coefficient of the advance (1 then 0.1, then 0.01, then 1, etc.); a pair of push buttons 17 controls the progress or stopping of the lathe. It will be noted that, in a characteristic manner, all the verification and control components are supported by the movable equipment 5; using this disposition, the lathe operator may visually follow the development of the piece during machining with all the means for verification, stopping or modifying this development within his reach.

Figure 2:
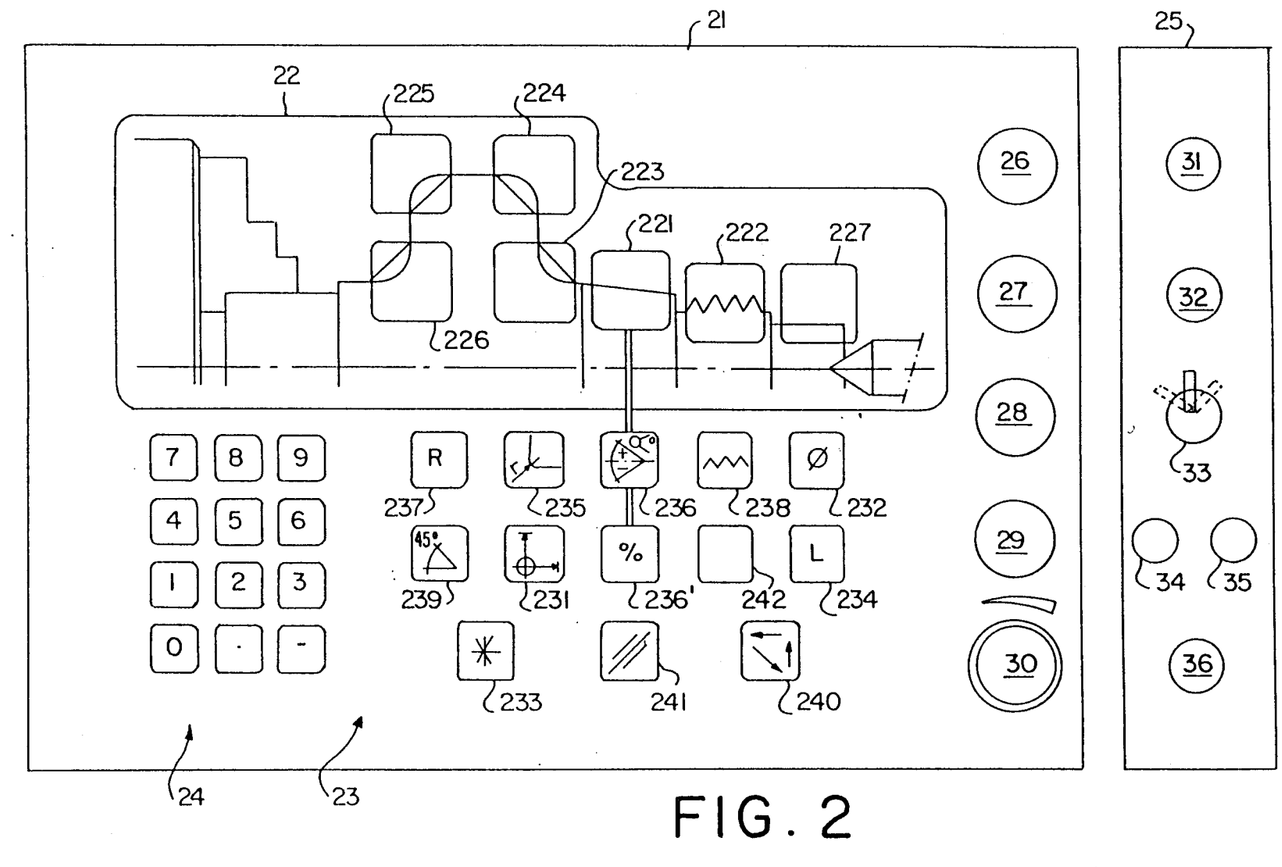
FIG. 2 illustrates a control panel with keyboard of the lathe of FIG. 1, FIG. 2a to 2e are curves illustrating the operation of the lathe of FIG. 1, whilst

In FIG. 2, two panels 21, 25 of the abovementioned control desk are represented.

The panel 21 itself comprises three keyboards: a keyboard 22, called a contour selection keyboard, a keyboard 23 called a machining parameter call keyboard, and a digital keyboard 24 for entering the digital value of the latter; the panel 21, moreover, comprises a register of push buttons and buttons, namely: a push button for controlling spraying 26, for controlling "forward" rotation of the rod 27, for controlling stopping of the rod 28, for controlling "rearward" rotation of the rod 29, and a button 30 for controlling the speed of the rod.

The panel 25 consists of a register of a push button and of switches intended to operate the memory of the automaton, that is to say once again means intended to make the lathe operate automatically according to the cycles. The register of the panel 25 comprises:

- a push button 31 intended for memorizing a machining cycle (turning, taper, etc) or a compulsory passage point; this push button may be used only in a "learning" mode.
- a push button 32: following pressure on this push button, all the displacements of tools commanded by the lever and control levers during machining of a first blank will be performed at high speed on the following blanks according to a straight path between the different points of passage memorized; if there is no pressure on this push button, the speed of displacement of the tool will be that of the machining operation recorded previously; this push button may be used only in a learning mode.
- a three-position switch 33: a so-called "normal" position in which the lathe is used in a conventional manner with only the control levers and with no memory facility; a so-called "learning" position in which operation of the lathe is identical to operation in normal mode, and in which machining cycles and displacements of the tool are memorized; a so-called "memory" position in which the lathe automatically repeatS all the machining movements of a piece which have been recorded in learning mode.
- a push button 34 controlling the start of the machining cycle when in "memory" mode,
- a push button 35 intended to cause stopping of the machining advances during automatic execution of a cycle; the execution of a cycle is restarted by another press on the push button 34.

It must now be understood that the keys of the contour selection keyboard 22 form, with the automaton, the means, called first means, defined above and that the keys of the parameter call and digital value of the latter entry keyboards 23, 24 constitute the means called second means defined above; a description will be given below using operating examples of the functions of the keys of keyboards 22 and 23.

A description will now be given with respect to FIGS. 2a to 2e of how the lathe of the invention is controlled by means of the control components of the movable equipment 5.

Figure 2A:
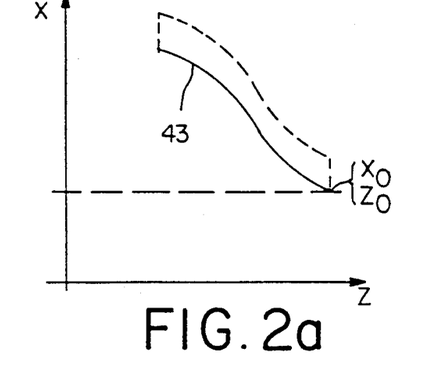

In FIG. 2a, the curve 40 represents any path of the tip of the tool while the part in dotted lines represents the disengagement and return path of the tool to its initial point. It will be noted that any such path does not figure among the paths which may be selected. On the other hand, FIGS. 2c to 2e illustrate paths which may be selected; the path 45 of FIG. 2c, called taper machining or taper or linear interpolation path, is normally defined by two parameters, for example of a slope, expressed as a percentage or in degrees and by either a machining diameter D or a machining length L; the path 46 of FIG. 2d, called a radial or circular interpolation path, is defined by the radius parameter (R); finally, the path of FIG. 2e, called the complex path, comprises a first linear interpolation path 47, a second circular interpolation path 48 and a third linear interpolation path 49; the parameters defining this path will be, for example, the values L1, $\alpha$1 for the part 47, L2 and $\alpha$2 for the part 49, and R for the part 48; it will be noted that the parameter L1 is the virtual length of the first part 47 at its intersection at 50 with the third part 49.

Figure 2B:
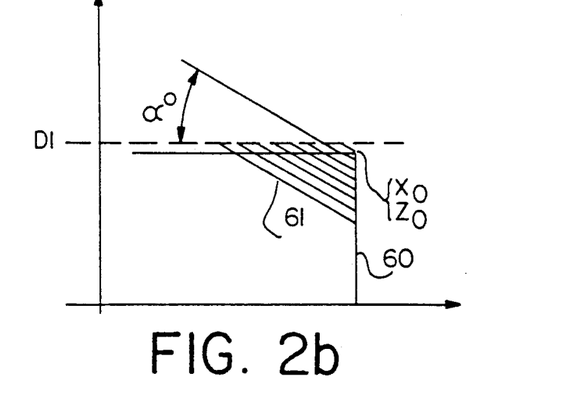
Figure 2C:
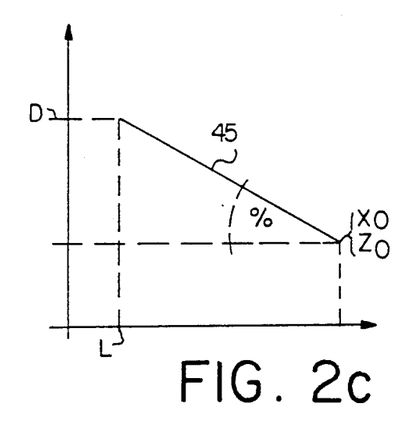
Figure 2D:
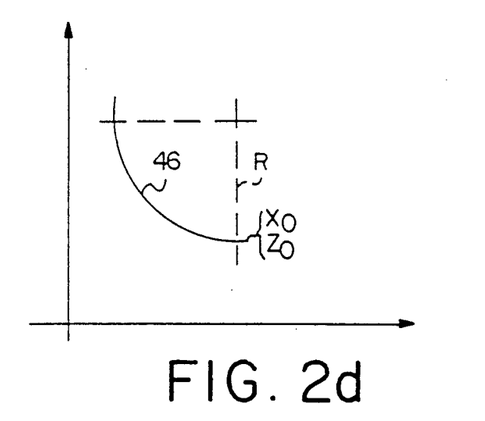
Figure 2E:
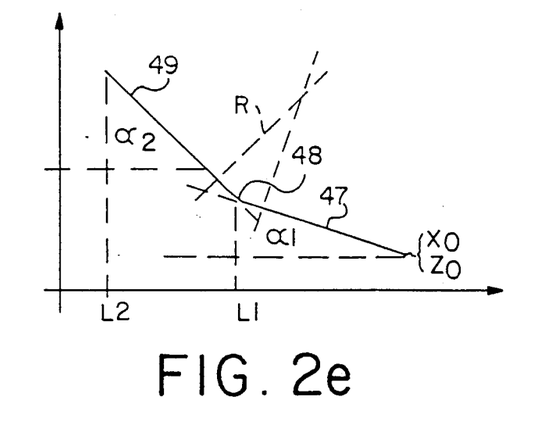
Figure 3:
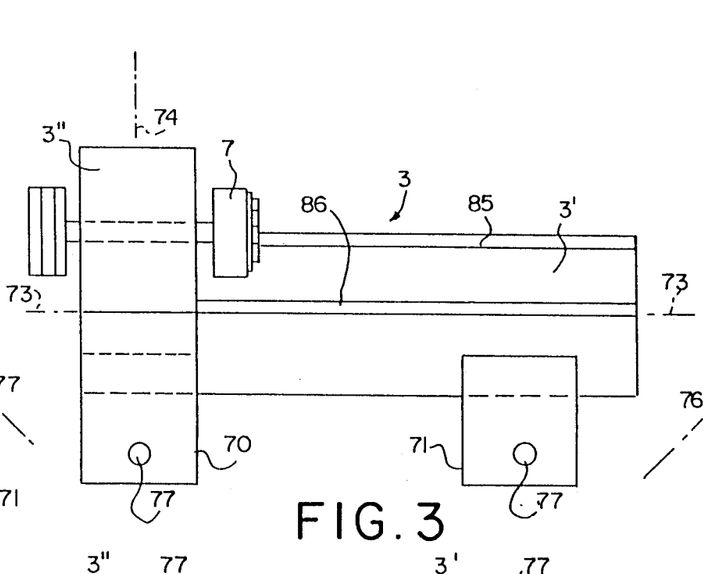
FIGS. 3 to 6 are diagrammatic representations from various angles of the bed assembly on its bases.
Figure 4:
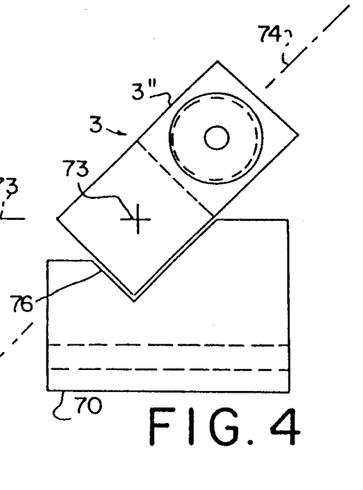
Figure 5:
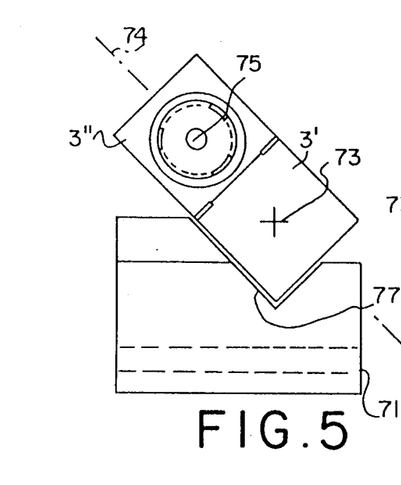
Figure 6:
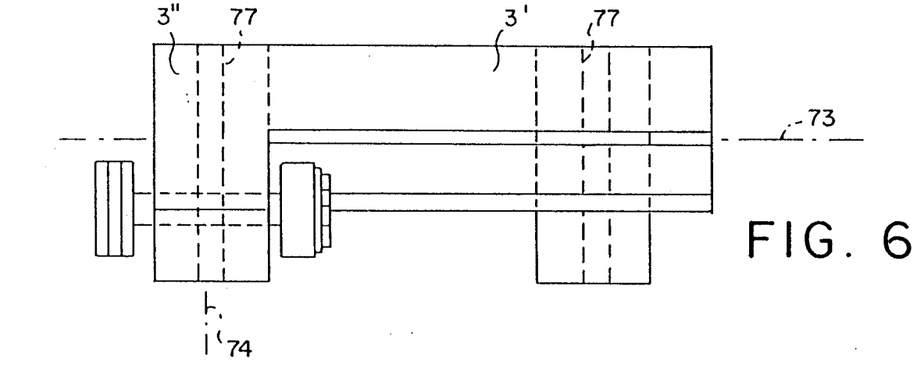

In FIG. 2b, a representation has been given of different machining passes on a cylindrical blank 60 with, as the choice of machining contour, the linear interpolation, and as parameter, $\alpha^o$, and D1; the first operation, after having selected the contour and entered the parameters, will consist in bringing the tool to a position $x_o$, $z_o$, by means of the control levers 13 and 14; then, the displacement of the lever 15 at position 15a (FIG. 1a) will trigger the displacement of the tool on its path until it reaches the diameter D1; at this stage, it will be able to return automatically to its position $x_o$, $z_o$ and the lever to its central position; by means of a second manipulation of the facing lever, the tool will be brought into position $x_1$, $z_o$; the positioning at 15 of the lever 15a will trigger a second facing pass of trajectory parallel to that of the first and so on until the desired dimensions are obtained.

Returning to the keyboard of panel 21 (FIG. 2) and to the path represented in FIG. 2e, a description will be given of the operations necessary for controlling such a machining operation, assuming that the usual preliminary operations of clamping the blank in the chuck, starting the rotation of the rod, choosing the speed of the rod, controlling spraying, etc., have been performed.

The sequence of operations may be as follows:

(a) enter the initial position and the tool coordinates:

Positioning passes with respect to diameter and length are performed and then these values measured and displayed by the machine are entered into the automaton by successively pressing on the keys:

231 for calling the dimensions (xo, zo) for the start of machining, then 232 for calling the dimension in terms of diameter, then 24 for entering on the keyboard the digital value of the starting diameter dimension ($x_o$), then 233 for validating the digital value entered above, then 234 for calling the dimension in terms of length, then 24 for entering on the keyboard the digital value of the starting dimension (zo) in terms of length, then 233 for validating this digital value, then 235 for calling for taking into account the radius of the machining tip, then 24 for entering the digital value of the tip radius, then 233 for validating this digital value.

(b) selection and dimensioning of the machining contour (or tool path)

Pressure is applied successively to the keys:

221 for selecting linear interpolation (exterior taper), (a second application of pressure on the key 221 would select an internal machining, therefore with removal of the tool towards the axis of the rod), 236 for calling the dimension of the slope in degrees or as a percentage (236'), then 24 for entering the digital value of the first slope, then 233 for validating, then 238 for calling the advance by the lathe, then 24 for entering the value of the advance by the lathe, then 233 for validating, then 234 for calling the dimension in terms of machining length, then 24 for entering the value of the machining exit length, then 233 for validation.

This sequence of operations defines the part 47 (first part) of the path of FIG. 2e.

Pressure on the key 237 (R) indicates to the automaton that this path will be joined to another path. At this stage, an image appears on the screen corresponding to the machining of two slopes connected by a radius.

Pressure is then applied to the keys:

24 for entering the value of the joining radius, 233 for validation, then 236 for calling the dimension of the second slope $a^o$ or per cent)

24 for entering the value of the slope, then 233 for validation, then 234 for calling the machining dimension in terms of length, then 24 for entering the digital value of the machining exit length, then 233 for validating the digital value re-entered previously, then 233 for validating in order to validate the whole screen page.

This sequence of operations defines the part 49 (second slope) of the path of FIG. 2e).

The contour having been thus defined, it will now be sufficient for the operator to trigger the displacement of the tool by means of the lever 15; the tool will perform a first path according to the complete path of FIG. 2e and will then disengage from the blank; the sequence of operations is the same as that indicated with respect to the description of FIG. 2b.

Pressure on the key 31 of the register 25, called memorization key, will permit the copying again by the automaton of all the operations performed after the triggering of the lever.

Pressure on the key 32 enables the tool to be disengaged whatever the machining mode, inner or outer, and the direction of turning may be; this push button therefore triggers means for automatically performing operations which manually would consist in placing the lever 15 in a central position and in disengaging the tool by means of the control levers 13 and 14; of course, using the automaton, the operation is performed in a time which is considerably reduced with respect to that needed for the manual operations.

Still on FIG. 2, a key 239 is noted, which is called a 45° bevel key; pressure on this key replaces, for this fairly frequent type of machining contour, all the operations of selecting a contour.

Still on FIG. 2, and more particularly on the keyboard 22 of the panel 21, it will be noted that the key 223 for executing the fourth quarter of a circle, adjacent to the keys 224, 225, 226 for executing the third, second and first quarters of a circle, respectively, and that a key 227 for turning or facing, makes it possible to select one of these single operations.

By way of example of facing a face in several passes, the sequence of operations may be as follows:

(c) entering of the initial position and of the tool coordinates (refer to a above).

(d) selection of machining contours

Pressure will be applied successively to the keys:

227 for selecting the turning or the facing, 232 for calling the dimension of the diameter indicating that the path will be a facing path, 24 for entering the digital value of the exit diameter, 233 for validating the numerical value entered, 238 for calling the advance by the lathe, 24 for entering the digital value of the advance by the lathe, 233 for validating the digital values entered.

After this, the passage of the lever 15 into position 15b will trigger the displacement of the tool on a path perpendicular to the axis of the rod until it arrives at the diameter entered; from here, it will either stop after having been disengaged from the blank, or will return automatically to its initial position; this latter alternative results from pressure, following a validation, on a key 239, called repetition key; the operator must then enter a new position $z_o$ by means of the control lever 13 and replace the lever in position 15b. Pressure on a key 241 cancels the preceding instructions including those memorized. A key 242 is a non-connected contact available for a function which could be added subsequently.

In FIGS. 3 to 6, it appears that a bed 3 is a monoblock L-shaped piece, of which a part 3', called a slide-holder, has its axis 73 oriented horizontally and of which another part 3", called a chuck-holder, or fixed headstock, has its large axis 74 perpendicular to the preceding axis; the plane formed by the axes 73 and 74 contains the axis 75 of the rod on which the chuck 7 is centered; this plane is advantageously inclined at approximately 60° to the horizontal, this angle giving the operator optimum visibility of the tool; it could, however, have a different incline, for example 45°, such as represented in the figures. It receives this inclined position by the fact that it is disposed on the bases 70 and 71 each comprising a recess 76, 77, respectively; elastomer joints, which are not visible in the figures, are disposed between the support faces of the bed and the recesses; the forced support of the bed on these bases is achieved by means of screws which are not shown; channels 77 pass right through the bases at their base in order to permit the passage of slinging bars.

Figure 7:
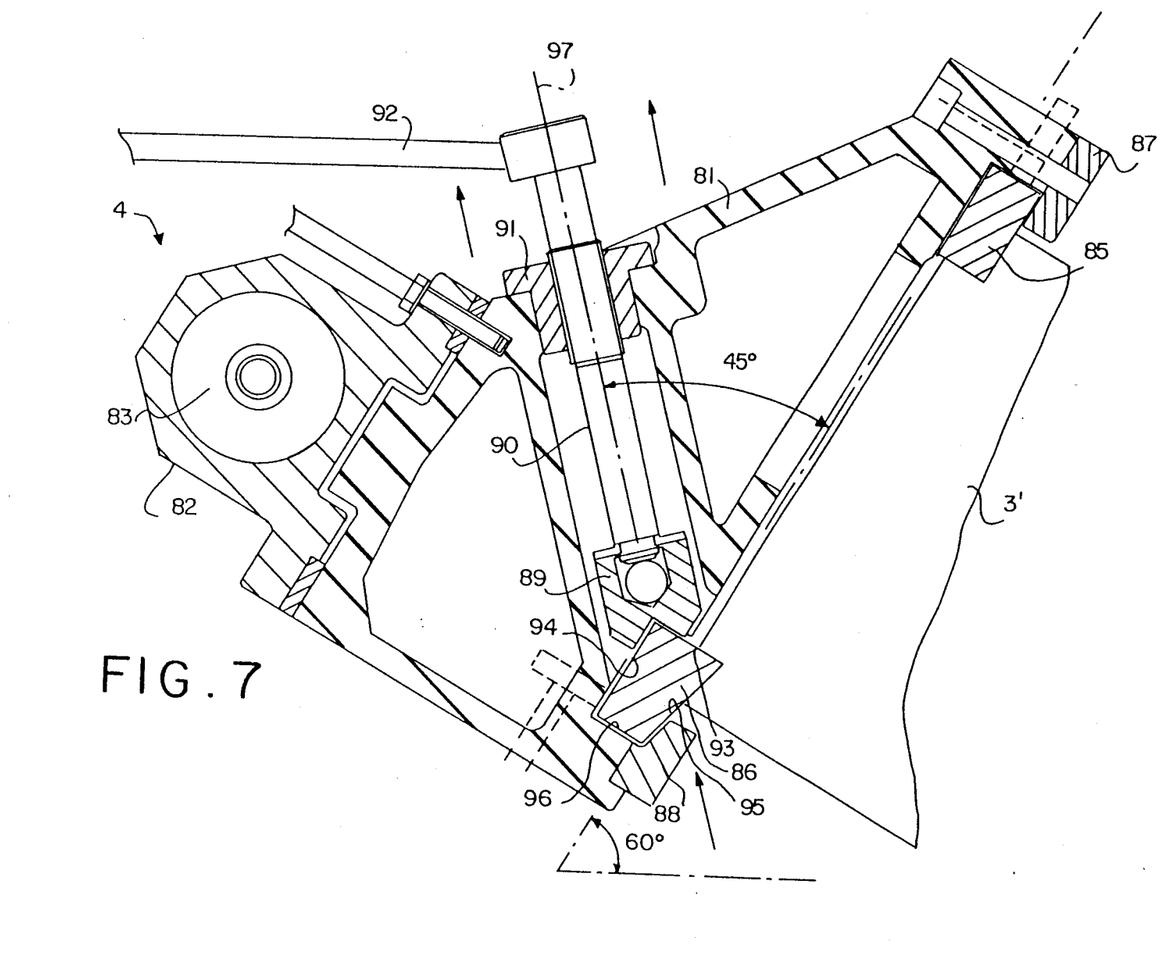
FIG. 7 is a section through a vertical plane perpendicular to the axis of the bed of the movable headstock on its slide.

In FIG. 7, the movable headstock 4, seen in cross-section, consists of a foot 81 and of a body 82 forming a screw sleeve 83.

According to the invention, the guide ways, called due to their shape "flat guide way" 85 and "inclined guide way" 86 respectively, fixed on the horizontal part 3' of the bed, project substantially on either side of the latter.

The foot comprises three buffers intended to slide along the guide ways 85 and 86 and/or to bear on them: the buffers 87 and 88, called flanges, are integral with the foot and fixed with respect to it whilst a buffer 89, called counterflange, or, due to its functions, immobilizing buffer, is mounted in single compensation at the end of a threaded shaft 90 which may be screwed into a bushing with a tapped hole 91 of the frame of the movable and maneuverable headstock by means of a lever 92. The buffers 87 to 89 are, of course, extended pieces.

It is noteworthy that the flanges 87 and 88 which are fixed with respect to the shoe are disposed below the guide ways 85 and 86 whilst the immobilizing buffer 89 which is movable with respect to the latter is disposed above. In this way, the immobilizing buffer 89, comprising a V-shaped groove at its end, is intended to bear against the faces called inner face 93 and upper face 94, respectively, of the inclined guide way 86, whilst the flange 88, which also comprises a V-shaped groove, is intended to bear on the faces called lower face 95 and outer face 96, respectively, of this guide way.

Then, immobilization of the foot, opposite to what is usually done, results from a traction on it in a direction away from the bed 3'.

The preferred incline at 60° of the plane of the guide ways with respect to the horizontal and the incline at approximately 45° of the axis of screw 97 with respect to the plane of the guide ways should also be observed on this figure.

Although particular embodiments of the present invention have been described and represented, it must be understood that the scope of the latter is not limited to these but that it encompasses any tool lathe comprising the characteristics set forth above.

We claim:

1. A center lathe type tool lathe, having a tool and a rotating chuck and capable of advancing the tool such that the advance of the tool is a function of the rotation (n) of the chuck, such lathe being capable of performing the operations of turning (displacement of the tool parallel to the axis of the rod), of facing (displacement of the tool perpendicularly to the axis of the rod), of linear threading interpolation (rapid displacement of the tool in proportion to the angle of rotation of the rod), of taper joining (succession of a linear interpolation, of a partial circular interpolation and of a second linear interpolation), said lathe employing a means of calculation and digital control known and located in a computer/operator center, also called a processor or automaton, which center effects the displacement of the tool, it also being possible for said tool lathe to comprise a means for electronically machining a countour and copying said contour, which electronic contour and copying means comprises:

a first means for selecting at least one machining contour or tool path from a plurality of elementary paths comprising turning, facing, linear interpolation path and circular interpolation path and threading, a second means which, when the tool has been manually brought by means of a pair of levers into an initial position ($x_o$, $e_o$) calls one or successively more parameters of this path of the group of parameters comprising a turning length, a final facing pass diameter, an angle of taper, a machining radius, a threading pitch (advance per turn), and in order to follow one parameter, introduces the digital value of this parameter, a third means, whereby the type of machining contour selected is displayed, and the parameter or parameters are called and their digital values are introduced, and, a handling means, whereby a machining contour having been selected and the tool being in the starting position, triggers the displacement of the tool on its path or, alternatively stops the tool at any point of its path.

2. The lathe as in claim 1, further comprising a fourth means which combines at least two of the elementary paths and thereby selects a complex path, said fourth means being controlled by a key of a keyboard.

3. The lathe as in claim 1, wherein machining is performed by a tool comprising a hard alloy tip having a certain radius and a tip-holder of a resilient alloy, and the lathe further comprising a fifth means controlled by at least one key of the keyboard, and which means can enter into the automaton the radius of the tip.

4. The lathe as in claim 3, further comprising a sixth or memorizing means which, once a first series of operations has been performed on a blank, memorizes a set of movements of the tool and, once another blank which is substantially identical to the first has replaced the first, can reproduces on this second blank the set of memorized movements.

5. The lathe as in claim 4, wherein the means are electronic digital means which are controlled by a keyboard, said means being assembled in the automaton, and wherein a pair of motors of an axis which are controlled in a closed loop are controlled by said automaton, and which are intended, respectively, to displace the tool accordingly to the axis (x) for one end to displace the tool according to the axis (z) for the other.

6. The lathe as in claim 1 having a saddle with a slide and a bed and, wherein the slide of the saddle is supported by the bed (3), which bed is of a composite material of natural granite or reconstituted-type granite, and wherein said bed has an L-shape, and which has a slide-holder (3'), which has a large axis (73) oriented horizontally, and which has a chuck-holder or fixed head stock (3") which has a large axis (74) oriented perpendicularly to the previous axis, and wherein the plane formed by both large axes (73,74) of each of the parts (3', 3"), is inclined at approximately a 60° angle to the horizontal plane.

7. The lathe as in claim 6, wherein said bed rests on a pair of bases (70, 71) of hydraulic concrete, each base having a recess (76, 77), for accommodating the bed, and further having elastomer joints which are disposed between the supporting faces, and wherein forced support of the bed on its bases is achieved by means of a screw.

8. The lathe as in claim 7, further comprising a tail stock, or movable head stock, which may be displaced along the guideways of the bed, or alternatively, which may be immobilized on the latter, and wherein the immobilization of the movable head stock (4) results from a traction on the guideways in a direction away from the bed (3').

9. The lathe as in claim 8, wherein the immobilization of the head stock results from a pressure exerted on one (88) of the guideways, called an inclined guideway, and along two opposite edges of the latter, by two buffers having a V-shaped groove, one of the buffers, called a flange (88), being intended to bear on the faces, called a lowerface (95) and an outerface (96), respectively, of said inclined guideway, and the other of the buffers called an immobilizing buffer (89), being intended to put pressure on the faces called an innerface (93) and an upperface (94), respectively, of said inclined guidway, said immobilizing buffer being mounted at the end of a threaded shaft which may be screwed into tapped hole (91) of the frame of the movable head stock and which is provided with a screwing lever (92).

* * * * *